United States Patent
Kurasawa

(10) Patent No.: US 10,317,851 B2
(45) Date of Patent: Jun. 11, 2019

(54) NUMERICAL CONTROL DEVICE AND CAUSE ANALYZING METHOD

(71) Applicant: FANUC CORPORATION, Yamanashi (JP)

(72) Inventor: Yasutaka Kurasawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/493,339

(22) Filed: Apr. 21, 2017

(65) Prior Publication Data

US 2017/0308042 A1    Oct. 26, 2017

(30) Foreign Application Priority Data

Apr. 22, 2016 (JP) ................. 2016-086080

(51) Int. Cl.
    *G05B 13/02* (2006.01)
    *G05B 19/404* (2006.01)
    *G05B 19/416* (2006.01)

(52) U.S. Cl.
    CPC .......... *G05B 13/02* (2013.01); *G05B 19/404* (2013.01); *G05B 19/416* (2013.01); *G05B 2219/40598* (2013.01); *G05B 2219/50179* (2013.01)

(58) Field of Classification Search
    CPC ................. G05B 13/02; G05B 19/404
    See application file for complete search history.

(56) References Cited

U.S. PATENT DOCUMENTS

| 2012/0283851 A1* | 11/2012 | Yamamoto | G05B 19/19 700/56 |
| 2014/0094970 A1* | 4/2014 | Otsuki | G05B 19/404 700/275 |
| 2014/0195037 A1* | 7/2014 | Nishibashi | G05B 19/4103 700/188 |
| 2015/0032247 A1* | 1/2015 | Hashizume | G05B 19/4063 700/159 |

FOREIGN PATENT DOCUMENTS

| CN | 104209808 A | 12/2014 |
| CN | 105388853 A | 3/2016 |
| DE | 278431 A1 | 5/1990 |
| DE | 102012219914 A1 | 4/2014 |
| JP | 2009-53744 A | 3/2009 |
| JP | 2011-221612 A | 11/2011 |

OTHER PUBLICATIONS

Office Action in DE Application No. 102017003834.1, dated Jul. 30, 2018, 10pp.

* cited by examiner

*Primary Examiner* — Muhammad S Islam

(74) *Attorney, Agent, or Firm* — Hauptman Ham, LLP

(57) ABSTRACT

A numerical control device includes: a data storage unit that cyclically associates and stores command speeds and actual speeds of a motor in chronological order; a difference pattern table that associates and stores causes of a difference between the command speed and the actual speed, and difference patterns of the causes; a cause analyzing unit that analyzes the cause of the difference between the command speed and the actual speed by comparing the command speeds and the actual speeds stored in chronological order in the data storage unit, with the difference patterns stored in the difference pattern table; and a display unit that displays the analyzed cause.

13 Claims, 6 Drawing Sheets

FIG. 2

| DIFFERENCE PATTERN | COMMAND SPEED Vx | ACTUAL SPEED Vy | EQUATION PATTERN | DIFFERENCE CAUSE |
|---|---|---|---|---|
| 1 | ⊓ | — | $Vx=(FIXED\ VALUE)$<br>$Vy=0$ | INTERLOCK<br>MACHINE LOCK<br>OVERRIDE 0 %<br>EXTERNAL SPEED 0 |
| 2 | ⊓ | ⊓ | $Vx=(FIXED\ VALUE)$<br>$Vy=(FIXED\ VALUE)$<br>$Vyp=(CONSTANT) \times Vx$ | OVERRIDE |
| 3 | ⊓ | ◁▷ | $Vx=(FIXED\ VALUE)$<br>$Vy=(CONSTANT) \times (TIME)$<br>$Vyp=Vx$ | ACCELERATION/<br>DECELERATION AFTER<br>INTERPOLATION |
| 4 | ⊓ | ◁▷ | $Vx=(FIXED\ VALUE)$<br>$Vy=(CONSTANT) \times (TIME)$<br>$Vyp=(CONSTANT) \times Vx$ | OVERRIDE +<br>ACCELERATION/<br>DECELERATION AFTER<br>INTERPOLATION |
| ... | | | | |

FIG. 4

| DIFFERENCE PATTERN | COMMAND SPEED Vx | INTERMEDIATE COMPENSATED SPEED Vm1 | INTERMEDIATE COMPENSATED SPEED Vm2 | INTERMEDIATE COMPENSATED SPEED Vm3 | INTERMEDIATE COMPENSATED SPEED Vm4 | ACTUAL SPEED Vy (Vm5) | EQUATION PATTERN | DIFFERENCE CAUSE |
|---|---|---|---|---|---|---|---|---|
| 1-1 | ▭ | | | | | | Vx=(FIXED VALUE)<br>Vm1=Vm2=Vm3=Vm4=Vy=0 | INTERLOCK |
| 1-2 | ▭ | ▭ | | | | | Vx=Vm1=(FIXED VALUE)<br>Vm2=Vm3=Vm4=Vy=0 | MACHINE LOCK |
| 1-3 | ▭ | ▭ | ▭ | | | | Vx=Vm1=Vm2=(FIXED VALUE)<br>Vm3=Vm4=Vy=0 | OVERRIDE 0 % |
| 1-4 | ▭ | ▭ | ▭ | ▭ | | | Vx=Vm1=Vm2=Vm3=(FIXED VALUE)<br>Vm4=Vy=0 | EXTERNAL SPEED 0 |

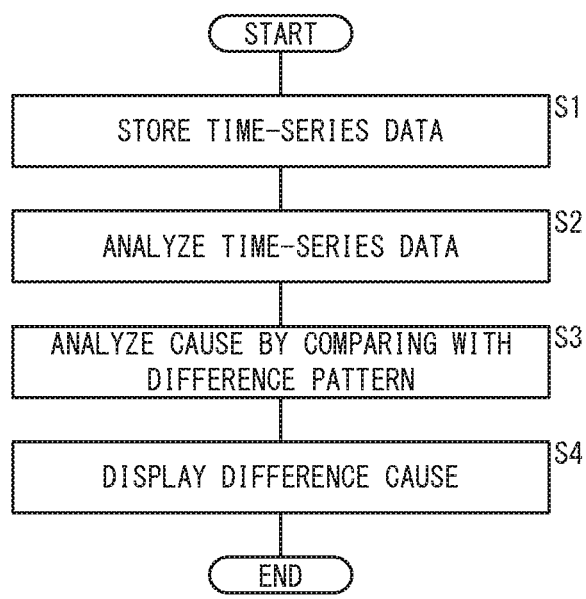

NUMERICAL CONTROL DEVICE AND CAUSE ANALYZING METHOD

CROSS-REFERENCE TO RELATED APPLICATION

This application is based upon and claims the benefit of priority from Japanese Patent Application No. 2016-086080 filed on Apr. 22, 2016, the contents of which are incorporated herein by reference.

BACKGROUND OF THE INVENTION

Field of the Invention

The present invention relates to a numerical control device and a cause analyzing method of analyzing a cause of a difference between a command speed and an actual speed of an electric motor.

Description of the Related Art

Japanese Laid-Open Patent Publication No. 2009-053744 (hereinafter referred to as "JP2009-053744A") discloses a method for finding a cause that a command speed and an actual speed of a servo motor differ during an automatic operation. More specifically, JP2009-053744A discloses specifying parameter data or control data that is actually activated while a machine tool processes or machines a work, from among a plurality of items of parameter data or control data for speed control and acceleration/deceleration control, and storing the specified parameter data or the specified control data, in association with a command value for a servo axis or a spindle axis or feedback values from these axes.

SUMMARY OF THE INVENTION

Thus, a technique disclosed in JP2009-053744A can specify a cause that the command speed and the actual speed differ during an automatic operation. However, when a plurality of functions limit the command speed, and the command speed and the actual speed differ, it is impossible to specify which function influences the actual speed to what extent. That is, the plurality of functions automatically compensate the command speed. Therefore, which speed compensation function of the plurality of functions makes a difference between the command speed and the actual speed to what extent, cannot be specified. Further, in a numerical control device, even though the command speed is not 0, the actual speed becomes 0 due to inadequacy of parameter setting or signal allocation between the numerical control device and a machine operation panel. However, according to JP2009-053744A, it is not possible to specify the cause thereof. Hence, when a trouble occurs in which an actual speed differs from a command speed, such that a feed shaft does not move, that a spindle does not turn, or that an intended speed cannot be realized, it is sometimes not possible to quickly deal with the problem. Further, JP2009-053744A cannot be applied to a manual operation.

It is therefore an object of the present invention to provide a numerical control device and a cause analyzing method of finding a cause of a difference between a command speed and an actual speed, even when a plurality of functions compensate the command speed or when parameter setting or signal allocation is inadequate.

A first aspect of the present invention is a numerical control device that includes a plurality of types of speed compensation functions of compensating a command speed of a motor, and controls driving of the motor. The device includes: a command speed calculating unit configured to calculate the command speed by analyzing a machining program or according to an operation of an operator; a speed/acceleration control unit configured to compute a control speed and a control acceleration of the motor, based on the command speed and one or more types of the speed compensation functions that are actually activated; a motor control unit configured to control the motor according to the control speed and the control acceleration; a data storage unit configured to cyclically associate and store the command speed and an actual speed of the motor in chronological order; a difference pattern table configured to associate and store a cause of a difference between the command speed and the actual speed, and a difference pattern of the cause; a cause analyzing unit configured to analyze the cause of the difference between the command speed and the actual speed by comparing the command speed and the actual speed stored in the chronological order in the data storage unit, with the difference pattern stored in the difference pattern table; and a display unit configured to display the cause analyzed by the cause analyzing unit.

According to this configuration, even when the plurality of types of speed compensation functions compensate the command speed, an operator can easily recognize the cause that the command speed and the actual speed differ, i.e., which speed compensation function has changed the actual speed from the command speed. Further, even when the actual speed differs from the command speed due to inadequacy of signal setting or inadequacy of parameter setting, under a situation that the operator does not intend, the operator can easily recognize the cause of the difference.

According to the first aspect of the present invention is the numerical control device, and the display unit may be configured to display as a graph the command speed and the actual speed stored in the chronological order in the data storage unit. Consequently, the operator can easily recognize how the actual speed changes from the command speed.

The first aspect of the present invention is the numerical control device, and the plurality of types of speed compensation functions may be classified into a first speed compensation function that is switched to activate and deactivate by the operation of the operator, and a second speed compensation function that is set in advance to activate. The speed compensation functions classified into the first speed compensation functions can be operated to activate and deactivate by the operator. However, even when the operator forgets what operation the operator has performed, even when another operator performs an operation, or under a situation that the operator does not intend, due to inadequacy of signal setting or inadequacy of parameter setting, it is possible to easily recognize the cause that the command speed and the actual speed differ. Further, the speed compensation function classified into the second speed compensation function is set in advance to activate. However, even in this case, the operator can easily recognize the cause or the reason why the command speed and the actual speed differ.

The first aspect of the present invention is the numerical control device, and the speed/acceleration control unit may include a compensated command speed calculating unit configured to compensate the command speed based on the command speed and the speed compensation function that is activated among the first speed compensation functions, and calculate a compensated command speed, and a speed/acceleration calculating unit configured to calculate the control speed and the control acceleration based on the compensated command speed and the second speed compensation function.

The first aspect of the present invention is the numerical control device, and the speed/acceleration control unit may be configured to calculate the control speed that is final by sequentially calculating from the command speed a plurality of intermediate compensated speeds associated with the plurality of types of speed compensation functions, the data storage unit may be configured to cyclically associate and store the plurality of intermediate compensated speeds in the chronological order, as well as the command speed and the actual speed, the difference pattern table may be configured to store a difference pattern of the command speed, the actual speed and the plurality of intermediate compensated speeds in association with the cause of the difference between the command speed and the actual speed, and the cause analyzing unit may be configured to analyze the cause of the difference between the command speed and the actual speed by comparing the command speed, the actual speed and the plurality of intermediate compensated speeds stored in the chronological order in the data storage unit, with the difference pattern stored in the difference pattern table. Consequently, even when causes that the command speed and the actual speed differ cannot be narrowed to one by using the command speeds and the actual speeds, it is possible to narrow the causes to one by using the intermediate compensated speeds. Consequently, when the plurality of types of speed compensation functions compensate the command speed, or when the actual speed differs from the command speed under the situation that the operator does not intend, due to the inadequacy of the signal setting or inadequacy of the parameter setting, the operator can easily recognize the cause of the difference between the command speed and the actual speed.

The first aspect of the present invention is the numerical control device, and the speed/acceleration control unit may be configured to calculate the control speed that is final by sequentially calculating from the command speed a plurality of intermediate compensated speeds associated with the plurality of types of speed compensation functions, the data storage unit may be configured to cyclically associate and store the plurality of intermediate compensated speeds in the chronological order, as well as the command speed and the actual speed, the cause analyzing unit may be configured to calculate a change of a speed by the speed compensation functions from the command speed and the plurality of intermediate compensated speeds to the actual speed stored in the chronological order in the data storage unit, and the display unit may be configured to display as a graph the command speed and the actual speed stored in the chronological order in the data storage unit, and display the change of the speed per speed compensation function as a stacked graph. Consequently, the operator can recognize which speed compensation function changes the speed to what extent, among the changes of the speeds from the command speeds to the actual speeds stored in the data storage unit in chronological order.

The first aspect of the present invention is the numerical control device, and the plurality of types of speed compensation functions may include at least one of interlock, machine lock, override, an external speed, and acceleration/deceleration after interpolation.

The first aspect of the present invention is the numerical control device, and the speed/acceleration control unit is configured to execute the plurality of types of speed compensation functions according to a predetermined order, and the speed compensation function that is deactivated does not compensate a speed.

The first aspect of the present invention is the numerical control device, and the speed compensation functions include at least one of a function of increasing the actual speed compared to the command speed, a function of decreasing the actual speed compared to the command speed, and a function of setting the actual speed to zero. Consequently, the speed compensation functions can flexibly compensate the actual speed with respect to the command speed.

A second aspect of the present invention is a cause analyzing method for a numerical control device including a plurality of types of speed compensation functions of compensating a command speed of a motor, wherein when driving of the motor is controlled, the method analyzes a cause of a difference between the command speed and an actual speed of the motor. The method includes: a command speed calculating step of calculating the command speed by analyzing a machining program or according to an operation of an operator; a speed/acceleration controlling step of computing a control speed and a control acceleration of the motor, based on the command speed and one or more types of the speed compensation functions that are actually activated; a motor controlling step of controlling the motor according to the control speed and the control acceleration; a storing step of cyclically associating and storing the command speed and an actual speed of the motor in chronological order in a data storage unit; a cause analyzing step of analyzing the cause of the difference between the command speed and the actual speed, by comparing the command speed and the actual speed stored in the chronological order in the data storage unit, with a difference pattern stored in association with the cause of the difference between the command speed and the actual speed in a difference pattern table; and a displaying step of displaying the cause analyzed in the cause analyzing step on a display unit.

According to this configuration, even when the plurality of types of speed compensation functions compensate the command speed, the operator can easily recognize the cause of the difference between the command speed and the actual speed, i.e., which speed compensation function has changed the actual speed from the command speed. Further, when the actual speed differs from the command speed under the situation that the operator does not intend, due to the inadequacy of the signal setting or the inadequacy of the parameter setting, the operator can easily recognize the cause of the difference.

The second aspect of the present invention is the cause analyzing method, and the plurality of types of speed compensation functions may be classified into a first speed compensation function that is switched to activate and deactivate by the operation of the operator, and a second speed compensation function that is set in advance to activate. The speed compensation functions classified into the first speed compensation functions can be operated to activate and deactivate by the operator. However, even when the operator forgets what operation the operator has performed, even when another operator performs the operation, or under the situation that the operator does not intend, due to the inadequacy of the signal setting or the inadequacy of the parameter setting, it is possible to easily recognize the cause of the difference between the command speed and the actual speed. Further, the speed compensation function classified into the second speed compensation function is set in advance to activate. However, even in this case, the operator can easily recognize the cause of the difference between the command speed and the actual speed.

The second aspect of the present invention is the cause analyzing method, and the speed/acceleration controlling step may include a compensated command speed calculating step of compensating the command speed based on the command speed and the speed compensation function that is activated among the first speed compensation functions, and calculating a compensated command speed, and a speed/acceleration calculating step of calculating the control speed and the control acceleration based on the compensated command speed and the second speed compensation function.

The second aspect of the present invention is the cause analyzing method, and, in the speed/acceleration controlling step, the control speed that is final may be calculated by sequentially calculating from the command speed a plurality of intermediate compensated speeds associated with the plurality of types of speed compensation functions, in the storing step, the plurality of intermediate compensated speeds, as well as the command speed and the actual speed, may be cyclically associated and stored in the chronological order in the data storage unit, the difference pattern table may store a difference pattern of the command speed, the actual speed and the plurality of intermediate compensated speeds in association with the cause of the difference between the command speed and the actual speed, and, in the cause analyzing step, the cause of the difference between the command speed and the actual speed may be analyzed by comparing the command speed, the actual speed and the plurality of intermediate compensated speeds stored in the chronological order in the data storage unit, with the difference pattern stored in the difference pattern table. Consequently, even when causes of the difference between the command speed and the actual speed cannot be narrowed to one by using the command speeds and the actual speeds, it is possible to narrow the causes to one by using the intermediate compensated speeds. Consequently, even when the plurality of types of speed compensation functions compensate the command speed or when the actual speed differs from the command speed under the situation that the operator does not intend, due to the inadequacy of the signal setting or the inadequacy of the parameter setting, the operator can easily recognize the cause that the command speed and the actual speed differ.

The second aspect of the present invention is the cause analyzing method, and, in the speed/acceleration controlling step, the control speed that is final may be calculated by sequentially calculating from the command speed the plurality of intermediate compensated speeds associated with the plurality of types of speed compensation functions, in the storing step, the plurality of intermediate compensated speeds, as well as the command speed and the actual speed, are cyclically associated and stored in the chronological order in the data storage unit, in the cause analyzing step, a change of a speed may be calculated, the speed being changed by the speed compensation function from the command speed and the plurality of intermediate compensated speeds to the actual speed stored in the chronological order in the data storage unit, and in the displaying step, the command speed and the actual speed stored in the chronological order in the data storage unit may be displayed as a graph, and the change of the speed per speed compensation function may be displayed as a stacked graph. Consequently, the operator can recognize which speed compensation function changes the speed to what extent as the changes of the speeds from the command speeds to the actual speeds stored in the data storage unit in the chronological order.

The second aspect of the present invention is the cause analyzing method, and, in the speed/acceleration controlling step, the plurality of types of speed compensation functions are executed according to a predetermined order, and the speed compensation function that is deactivated does not compensate a speed.

According to the present invention, even when the plurality of types of speed compensation functions compensate the command speed, the operator can easily recognize the cause of the difference between the command speed and the actual speed.

Further, even when the actual speed differs from the command speed under the situation that is not intended by the operator, due to the inadequacy of the signal setting or the inadequacy of the parameter setting, the operator can easily recognize the cause of the difference.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a conceptual diagram showing causes that a command speed and an actual speed differ, and difference patterns of the causes stored in a difference pattern table shown in FIG. 1;

FIG. 4 is a conceptual diagram showing contents of a difference pattern table formed by assembling a plurality of intermediate compensated speeds in the difference patterns of the difference pattern table;

FIG. 6 is a flowchart showing an analyzing operation of analyzing a cause of the difference between a command speed and an actual speed.

DESCRIPTION OF THE PREFERRED EMBODIMENTS

A preferred embodiment of a numerical control device and a cause analyzing method according to the present invention will be described below in detail with reference to the accompanying drawings.

Figure 1:
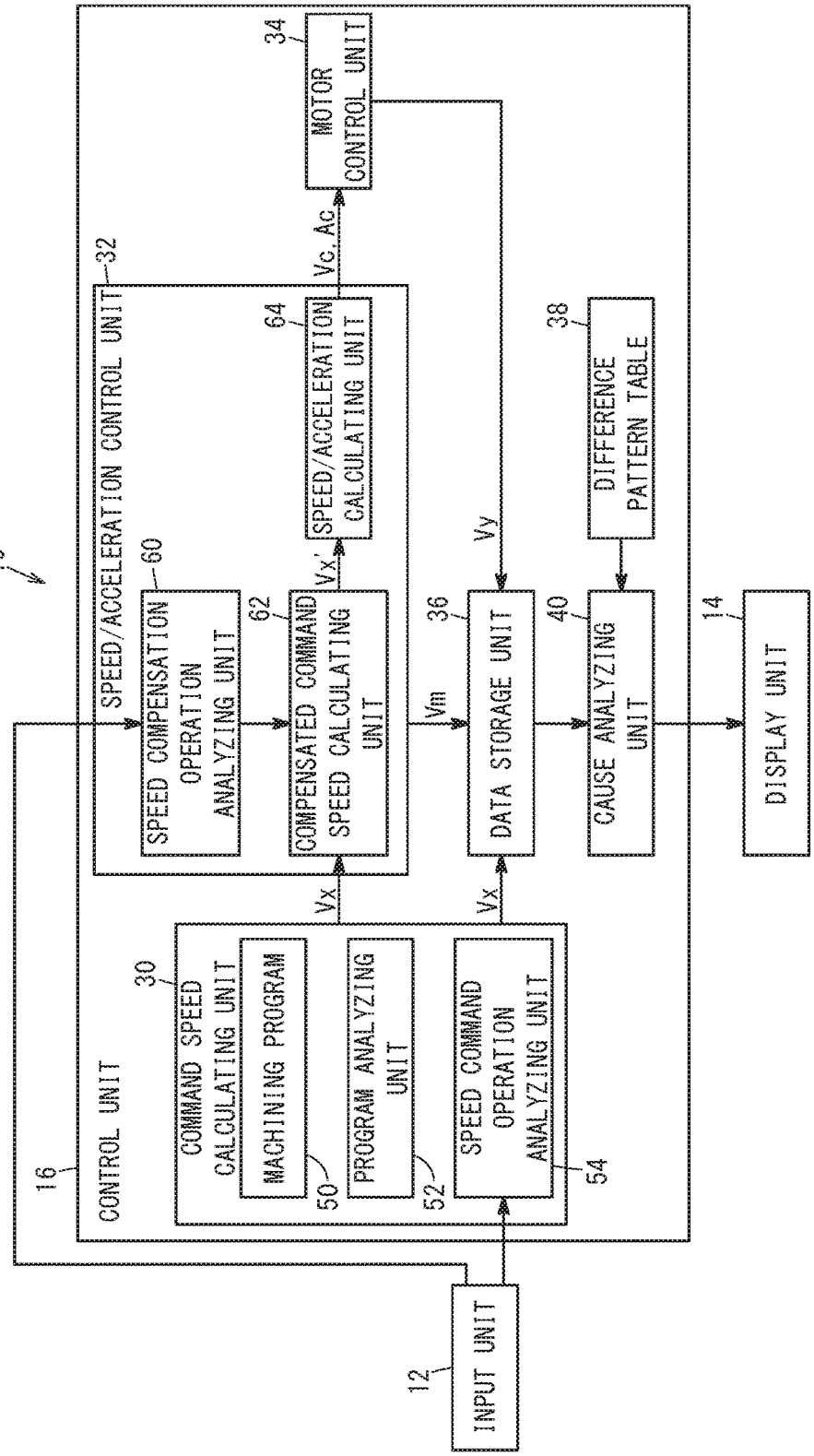
FIG. 1 is a functional block diagram showing a configuration of a numerical control device.

FIG. 1 is a configuration diagram (functional block diagram) showing a configuration of a numerical control device 10. The numerical control device 10 has a plurality of types of speed compensation functions for compensating a command speed of a motor (e.g., servo motor) such as an electric motor provided to a machine tool that is not shown, and controls driving of the motor. Driving of the motor rotates a machining axis of the machine tool, and feeds a tool or a table on which a work is placed along each axis. The numerical control device 10 includes an input unit 12, a display unit 14 and a control unit 16. The input unit 12 is an operation unit that receives an input of data. This input unit 12 is composed of a mouse, a keyboard, and the like. The display unit 14 is composed of a liquid crystal display or an organic EL display, and displays on a screen, information that is necessary for an operator or information that is necessary for the operator to input data. Consequently, the operator can input necessary data by operating the input unit 12 while looking at the screen of the display unit 14. The input unit 12 may be a touch panel provided to the display unit 14. In this case, it is possible to input data by touching the screen of the display unit 14 by a finger.

The control unit 16 includes a computer and a storage medium in which programs are stored, and functions as the control unit 16 according to the present embodiment when the computer executes the program stored in the storage medium. The control unit 16 includes a command speed calculating unit 30, a speed/acceleration control unit 32, a motor control unit 34, a data storage unit 36, a difference pattern table 38 and a cause analyzing unit 40.

The command speed calculating unit 30 calculates a command speed Vx of the motor by analyzing a machining program (e.g., a machining program) or according to an operator's operation. The command speed calculating unit 30 successively calculates the command speeds Vx at a predetermined cycle along a time axis. More specifically, the command speed calculating unit 30 includes a machining program 50, a program analyzing unit 52 and a speed command operation analyzing unit 54. The machining program 50 is stored in a storage medium of the command speed calculating unit 30 that is not shown. The program analyzing unit 52 analyzes the machining program 50 and calculates the command speed Vx. Hence, the program analyzing unit 52 calculates the command speed Vx by using the machining program 50 during an automatic operation of the motor. The speed command operation analyzing unit 54 analyzes the operator's operation of the input unit 12, and calculates the command speed Vx. Hence, the speed command operation analyzing unit 54 calculates the command speed Vx according to the operator's operation during a manual operation of the motor. The command speed calculating unit 30 outputs the calculated command speed Vx to the speed/acceleration control unit 32 and the data storage unit 36.

The speed/acceleration control unit 32 computes the control speed Vc and the control acceleration Ac of the motor based on the command speed Vx and one or more types of speed compensation functions that are actually activated. The types of the speed compensation functions include, for example, interlock, machine lock, override, an external speed, and acceleration/deceleration after interpolation. The interlock temporarily stops driving of the motor by stopping executing the machining program, and the machine lock temporarily stops driving of the motor although the machining program is executed. Hence, when the interlock or the machine lock is activated, the control speed Vc of the motor is 0. The override determines at what % of a speed the motor is driven with respect to the command speed Vx. When, for example, the override is 0%, the motor stops driving and, when the override is 50%, the motor is driven at a speed that is 50% of the command speed Vx. Further, when the override is 120%, the motor is driven at the speed that is 120% with respect to the command speed. Consequently, the override can increase or decrease the motor speed with respect to the command speed Vx. The external speed drives the motor at a speed determined based on a parameter set irrespectively of the command speed Vx. Consequently, the external speed can slow down the motor speed with respect to the command speed Vx. Further, the acceleration/deceleration after interpolation makes the motor speed gradually become closer to the command speed Vx at a predetermined time constant. In this regard, the external speed may increase the motor speed compared to the command speed Vx.

The plurality of types of speed compensation functions are classified into first speed compensation functions that are switched to activate and deactivate by an operator's operation, and a second speed compensation function that is set in advance to activate. The speed compensation functions classified into the first speed compensation functions include, for example, the interlock, the machine lock, the override and the external speed, and the speed compensation function classified into the second speed compensation function includes, for example, the acceleration/deceleration after interpolation. When there are a plurality of activated speed compensation functions, a control speed Vc is computed by compensating the command speed Vx, based on the plurality of these activated speed compensation functions.

The speed/acceleration control unit 32 executes the plurality of types of speed compensation functions according to a predetermined order. Hence, the speed/acceleration control unit 32 computes the final control speed Vc by sequentially computing from the command speed Vx a plurality of intermediate compensated speeds Vm associated with the plurality of types of speed compensation functions. That is, the speed/acceleration control unit 32 computes the plurality of intermediate compensated speeds Vm associated with the plurality of types of speed compensation functions, in a process of computing the control speed Vc from the command speed Vx based on the command speed Vx and the plurality of types of speed compensation functions. In this case, only the activated speed compensation functions compensate the speed, and the deactivated speed compensation functions do not compensate the speed. The speed/acceleration control unit 32 successively computes the plurality of intermediate compensated speeds Vm and the control speed Vc from the command speed Vx at the predetermined cycle along the time axis.

In the present embodiment, the plurality of types of speed compensation functions are executed in order of the interlock→the machine lock→the override→the external speed→the acceleration/deceleration after interpolation. Further, Vm1 represents the intermediate compensated speed Vm associated with the interlock, Vm2 represents the intermediate compensated speed Vm associated with the machine lock, and Vm3 represents the intermediate compensated speed Vm associated with the override. Furthermore, Vm4 represents the intermediate compensated speed Vm associated with the external speed, and Vm5 represents the intermediate compensated speed Vm associated with the acceleration/deceleration after interpolation. Since the acceleration/deceleration after interpolation is lastly executed, the intermediate compensated speed Vm5 associated with the acceleration/deceleration after interpolation is the control speed Vc. In view of the above, in the process of computing the control speed Vc from the command speed Vx, the plurality of intermediate compensated speeds Vm are computed in order of Vm1→Vm2→Vm3→Vm4, and the control speed Vc (intermediate compensated speed Vm5) is finally derived.

When, for example, the interlock, the machine lock and the external speed are deactivated, and the override and the acceleration/deceleration after interpolation are activated, the intermediate compensated speeds Vm1 and Vm2 are the same speed as the command speed Vx. The intermediate compensated speed Vm3 is a speed acquired by compensating the intermediate compensated speed Vm2 by the override, the intermediate compensated speed Vm4 is the same speed as Vm3, and the intermediate compensated speed Vm5 (control speed Vc) is a speed acquired by compensating the intermediate compensated speed Vm4 by the acceleration/deceleration after interpolation. The speed/acceleration control unit 32 outputs the computed control speed Vc and a control acceleration Ac to the motor control unit 34, and outputs the computed intermediate compensated speeds Vm1 to Vm5 to the data storage unit 36.

More specifically, the speed/acceleration control unit 32 includes a speed compensation operation analyzing unit 60, a compensated command speed calculating unit 62 and a speed/acceleration calculating unit 64. The speed compensation operation analyzing unit 60 analyzes the operator's operation to the input unit 12, and acquires speed compensation information operated by the operator. This speed compensation information includes activation/deactivation of the interlock, the machine lock, the override, and the external speed, which are classified into the first speed compensation functions, and a value (compensation amount) of % of the override when the override is activated, and a parameter (compensation amount) that defines the external speed when the external speed is activated. The speed compensation operation analyzing unit 60 outputs the acquired speed compensation information to the compensated command speed calculating unit 62.

The compensated command speed calculating unit 62 calculates a compensated command speed Vx' by compensating the command speed Vx, based on the command speed Vx and the activated speed compensation functions among the first speed compensation functions. The compensated command speed calculating unit 62 calculates the compensated command speed Vx' by sequentially calculating from the command speed Vx the intermediate compensated speeds Vm1 to Vm4 associated with the plurality of types of speed compensation functions classified into the first speed compensation functions. Consequently, the intermediate compensated speed Vm4 associated with the external speed is the compensated command speed Vx'. The compensated command speed calculating unit 62 outputs the calculated compensated command speed Vx' to the speed/acceleration calculating unit 64, and outputs the calculated intermediate compensated speeds Vm1 to Vm4 to the data storage unit 36.

The speed/acceleration calculating unit 64 calculates the control speed Vc and the control acceleration Ac based on the compensated command speed Vx' and the second speed compensation function. In the present embodiment, the speed compensation function classified into the second speed compensation function is only one, i.e., the acceleration/deceleration after interpolation. Therefore, the speed/acceleration calculating unit 64 calculates the control speed Vc (intermediate compensated speed Vm5) and the control acceleration Ac based on the compensated command speed Vx' and the acceleration/deceleration after interpolation. When the acceleration/deceleration after interpolation is set to the speed/acceleration calculating unit 64, parameters that define a time constant are stored in a storage medium of the speed/acceleration calculating unit 64 that is not shown. The speed/acceleration calculating unit 64 (speed/acceleration control unit 32) outputs the calculated control speed Vc and control acceleration Ac to the motor control unit 34, and outputs the calculated intermediate compensated speed Vm5 (control speed Vc) to the data storage unit 36.

In this regard, when the second speed compensation function is not set to the speed/acceleration calculating unit 64, the speed/acceleration calculating unit 64 calculates the control speed Vc and the control acceleration Ac based on the compensated command speed Vx' without compensating the speed. Further, when a plurality of speed compensation functions that are classified into the second speed compensation functions are set to the speed/acceleration calculating unit 64, the speed/acceleration calculating unit 64 calculates the plurality of intermediate compensated speeds Vm associated with the plurality of speed compensation functions. For example, the speed compensation functions that are classified into the second speed compensation functions include a function of reducing a tool speed at a corner, as well as the acceleration/deceleration after interpolation. Thus, the speed/acceleration calculating unit 64 calculates the control speed Vc that fluctuates as time passes, based on the identical compensated command speed Vx' (or the command speed Vx). By contrast with this, the compensated command speed calculating unit 62 calculates the compensated command speed Vx' acquired by simply increasing or decreasing the command speed Vx, and the compensated command speed Vx' does not fluctuate from the identical command speed Vx as time passes unless the operator performs an operation.

The motor control unit 34 controls driving of the motor based on the control speed Vc and the control acceleration Ac. The motor is provided with a rotation position detector such as an encoder, and the motor control unit 34 cyclically calculates an actual speed (rotation speed) Vy of the motor based on a rotation position of the motor detected by the rotation position detector, and performs feedback control on the motor based on the calculated actual speed Vy. This feedback control makes the control speed Vc and the actual speed Vy of the motor fundamentally identical. The motor control unit 34 outputs the calculated actual speed Vy to the data storage unit 36. In this regard, the intermediate compensated speed Vm5 (control speed Vc) and the actual speed Vy of the motor are fundamentally identical, and therefore the speed/acceleration calculating unit 64 does not need to output the lastly calculated intermediate compensated speed Vm5 to the data storage unit 36. The present embodiment will be described assuming that the speed/acceleration calculating unit 64 does not output the intermediate compensated speed Vm5 to the data storage unit 36 unless otherwise described.

The data storage unit 36 associates and stores the command speeds Vx and the actual speeds Vy in chronological order. In this case, the data storage unit 36 may associate and store the plurality of intermediate compensated speeds Vm1 to Vm4 in chronological order, as well as the command speeds Vx and the actual speeds Vy.

The difference pattern table 38 stores causes of the difference between the command speed Vx and the actual speed Vy, in association with difference patterns of the causes. FIG. 2 is a conceptual diagram showing the causes of the difference between the command speed Vx and the actual speed Vy, and the difference patterns of the causes (the difference patterns of the command speed Vx and the actual speed Vy) stored in the difference pattern table 38. As shown in FIG. 2, a difference pattern 1 is a difference pattern in a case where a difference cause is the interlock, the machine lock, the override 0%, or the external speed 0. In this case, the command speed Vx is fixed (Vx>0 in this case), and the actual speed Vy is 0. A difference pattern 2 is a difference pattern in a case where the difference cause is the override (not 0% in this case). In this case, the command speed Vx is fixed (Vx>0 in this case). Further, the actual speed Vy is fixed (Vy>0 in this case) and a peak value Vyp of this actual speed Vy is Vyp=constant×Vx.

A difference pattern 3 is a difference pattern in a case where the difference cause is the acceleration/deceleration after interpolation. In this case, the command speed Vx is fixed (Vx>0 in this case). Further, the actual speed Vy includes an area that changes according to Vy=constant×time, and the peak value Vyp of the actual speed Vy is Vyp=Vx. A difference pattern 4 is a difference pattern in a case where the difference cause is a combination of the override and the acceleration/deceleration after interpolation. In this case, the command speed Vx is fixed (Vx>0 in this case). Further, the actual speed Vy includes an area that changes according to Vy=constant×time, and the peak value Vyp of the actual speed Vy is Vyp=constant×Vx. Thus, the difference pattern table 38 stores a plurality of difference causes that the command speed Vx and the actual speed Vy differ, and the difference patterns associated with the difference causes.

The cause analyzing unit 40 analyzes the cause that the command speed Vx and the actual speed Vy differ, by comparing the pluralities of command speeds Vx and actual speeds Vy stored in chronological order in the data storage unit 36, and the difference patterns stored in the difference pattern table 38. The cause analyzing unit 40 specifies a waveform formed by the command speed Vx and a waveform formed by the actual speed Vy by analyzing the command speeds Vx and the actual speeds Vy stored in the data storage unit 36 to compare with the difference patterns stored in the difference pattern table 38. Further, the cause analyzing unit 40 outputs an analysis result (analyzed difference cause) to the display unit 14, and the display unit 14 displays the difference cause which is the analysis result. That is, the display unit 14 displays by which speed compensation function, the actual speed Vy has been changed from the command speed Vx.

Figure 3:
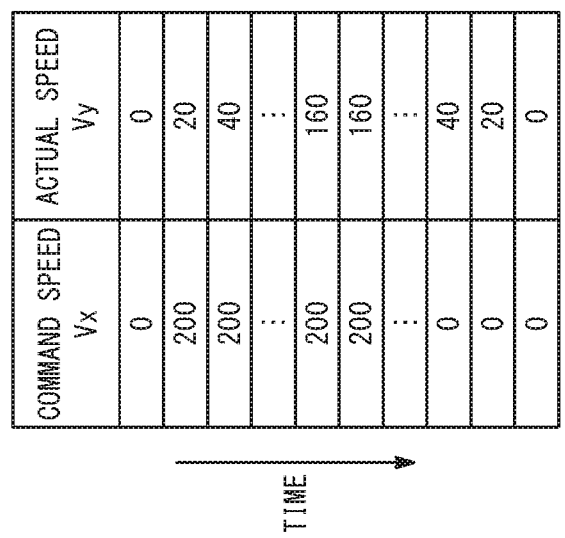
FIG. 3 is a view showing pluralities of command speeds and actual speeds stored in chorological order in a data storage unit shown in FIG. 1.

FIG. 3 is a view showing the pluralities of command speeds Vx and actual speeds Vy stored in chronological order in the data storage unit 36. The cause analyzing unit 40 analyzes the plurality of command speeds Vx stored in chronological order, and determines that the command speeds Vx are fixed (Vx>0 in this case). Further, the cause analyzing unit 40 analyzes the plurality of actual speeds Vy stored in chronological order, and determines that there is an area (inclined area) of Vy=constant×time and the peak value Vyp of the actual speed Vy is constant×Vx. Hence, the cause analyzing unit 40 determines that the difference pattern corresponds to the difference pattern 4 in comparison with the difference patterns stored in the difference pattern table 38, and analyzes that the difference causes are the override and the acceleration/deceleration after interpolation. Hence, the display unit 14 displays that the difference causes are the override, and the acceleration/deceleration after interpolation.

In this regard, when the command speeds Vx and the actual speeds Vy stored in chronological order in the data storage unit 36 correspond to the difference pattern 1 in a case of the difference pattern table 38 shown in FIG. 2, the difference causes cannot be narrowed to one. That is, since there are a plurality of difference causes such as the interlock, the machine lock, the override 0% and the external speed 0 associated with the difference pattern 1, the difference causes cannot be narrowed to one. Hence, by assembling the plurality of intermediate compensated speeds Vm1 to Vm4 in the difference patterns of the difference pattern table 38, it is possible to narrow the difference causes to one even when there are the plurality of difference causes. That is, difference patterns of the command speeds Vx, the actual speed Vy and the plurality of intermediate compensated speeds Vm1 to Vm4 are stored in the difference pattern table 38.

FIG. 4 is a conceptual diagram showing contents of the difference pattern table 38 in a case where the plurality of intermediate compensated speeds Vm1 to Vm4 are assembled or incorporated in the difference patterns of the difference pattern table 38. The difference pattern 1 includes a plurality of (four in the present embodiment) difference causes, and therefore the difference pattern 1 is divided per difference cause. A divided difference pattern 1-1 is a difference pattern in a case where the difference cause is the interlock. In this case, the command speed Vx is fixed (Vx>0 in this case), and the intermediate compensated speeds Vm1 to Vm4 and the actual speed Vy (the intermediate compensated speed Vm5 and the control speed Vc) are 0. A difference pattern 1-2 is a difference pattern in a case where the difference cause is the machine lock. In this case, the command speed Vx and the intermediate compensated speed Vm1 are fixed (Vx and Vm1>0 in this case), and the intermediate compensated speeds Vm2 to Vm4 and the actual speed Vy (the intermediate compensated speed Vm5 and the control speed Vc) are 0. A difference pattern 1-3 is a difference pattern in a case where the difference cause is the override 0%. In this case, the command speed Vx and the intermediate compensated speeds Vm1 and Vm2 are fixed (Vx, Vm1 and Vm2>0 in this case), and the intermediate compensated speeds Vm3 and Vm4 and the actual speed Vy (the intermediate compensated speed Vm5 and the control speed Vc) are 0. A difference pattern 1-4 is a difference pattern in a case where the difference cause is the external speed 0. In this case, the command speed Vx and the intermediate compensated speeds Vm1 to Vm3 are fixed (Vx and Vm1 to Vm3>0 in this case), and the intermediate compensated speed Vm4 and the actual speed Vy (the intermediate compensated speed Vm5 and the control speed Vc) are 0.

Consequently, the command speeds Vx, the actual speeds Vy and the plurality of intermediate compensated speeds Vm1 to Vm4 are stored in chronological order in the data storage unit 36 to prepare the difference pattern table 38 shown in FIG. 4. Consequently, the cause analyzing unit 40 can analyze the difference cause even when the command speeds Vx and the actual speeds Vy stored in chronological order in the data storage unit 36 correspond to the difference pattern 1. In addition, FIG. 4 shows only the difference patterns 1 (1-1 to 1-4). However, the plurality of intermediate compensated speeds Vm1 to Vm4 may be assembled in other difference patterns (e.g., difference patterns 2 to 4) in a similar manner.

Further, the display unit 14 may display the command speeds Vx and the actual speed Vy stored in chronological order in the data storage unit 36 as a graph. Furthermore, the cause analyzing unit 40 may calculate changes of speeds by the speed compensation functions from the command speeds Vx to the actual speeds Vy stored in chronological order in the data storage unit 36. Still further, the display unit 14 may display the command speeds Vx and the actual speeds Vy stored in chronological order in the data storage unit 36 as the graph, and display the changes of the speeds by the speed compensation functions as a stacked bar graph. Consequently, the operator can recognize which speed compensation function changes the speed to what extent as the changes of the speeds from the command speeds Vx to the actual speeds Vy stored in chronological order in the data storage unit 36.

Figure 5:
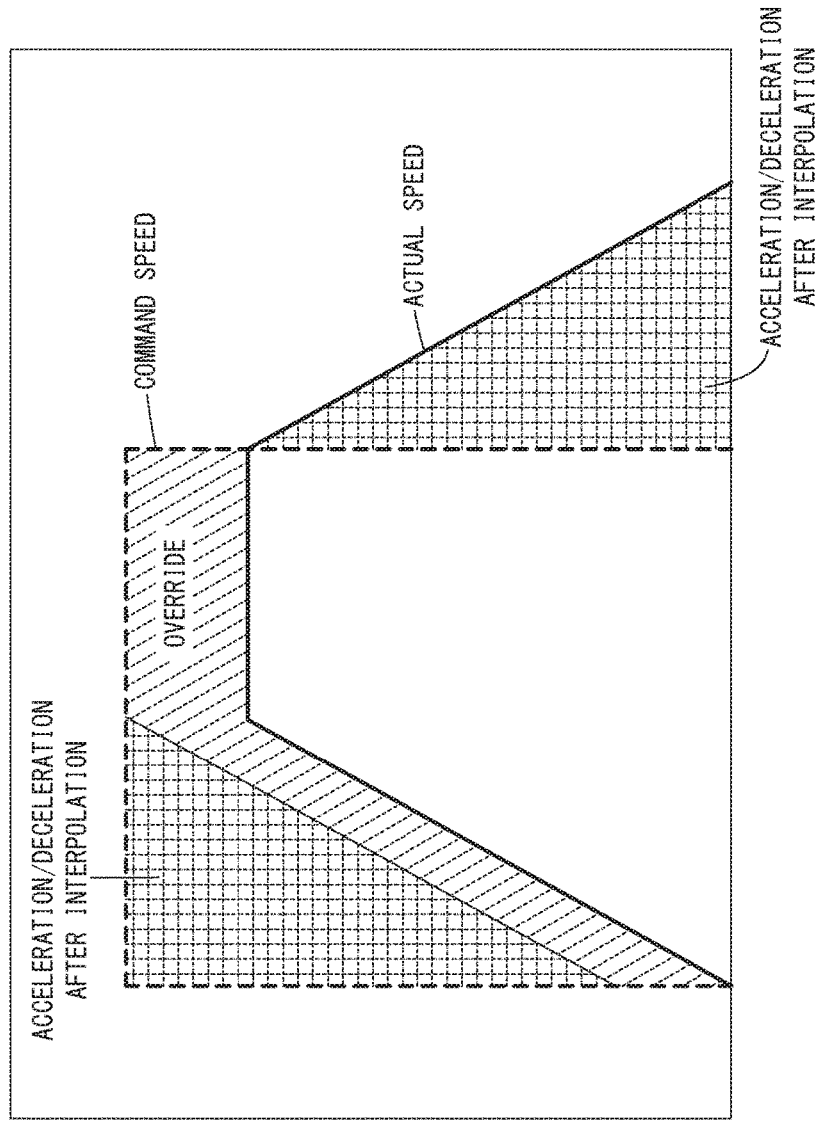
FIG. 5 is a view showing an example of a stacked bar graph displayed by a display unit in a case where command speeds, actual speeds and a plurality of intermediate compensated speeds associated with a difference pattern 4 are stored in chronological order in the data storage unit.

FIG. 5 is a view showing an example of the stacked bar graph displayed by the display unit 14 in a case where the command speeds Vx, the actual speeds Vy and the plurality of intermediate compensated speeds Vm1 to Vm4 associated with the difference pattern 4 are stored in chronological order in the data storage unit 36. An area indicated by diagonal lines in FIG. 5 indicates the change of the speed by the override (i.e., command speed Vx–intermediate compensated speed Vm3), and an area indicated by a cross hatching indicates a change of a speed changed by the acceleration/deceleration after interpolation (i.e., intermediate compensated speed Vm3–actual speed Vy (the control speed Vc and the intermediate compensated speed Vm5)).

FIG. 6 is a flowchart showing an analyzing operation of analyzing a cause of the difference between the command speed Vx and the actual speed Vy. In step S1, the data storage unit 36 associates and cyclically stores in chronological order the command speeds Vx calculated by the command speed calculating unit 30 and the actual speeds Vy of the motor driven based on the command speeds Vx (step S1). In this case, the data storage unit 36 may also cyclically store in chronological order the plurality of intermediate compensated speeds Vm1 to Vm4 calculated by the speed/acceleration control unit 32, in association with the command speeds Vx and the actual speeds Vy. In this regard, the data storage unit 36 may store the intermediate compensated speed Vm5 computed by the speed/acceleration control unit 32, too.

Next, the cause analyzing unit 40 analyzes the command speeds Vx and the actual speeds Vy stored in chronological order in the data storage unit 36 (step S2), and analyzes the difference cause by comparing the command speeds Vx and the actual speeds Vy with the difference patterns stored in the difference pattern table 38 shown in FIG. 2 (step S3). In this case, the cause analyzing unit 40 may analyze the command speeds Vx, the actual speeds Vy and the plurality of intermediate compensated speeds Vm stored in chronological order in the data storage unit 36 (step S2), and analyze the difference cause by comparing the command speeds Vx and the actual speeds Vy with the difference patterns stored in the difference pattern table 38 shown in FIG. 4 (step S3). Further, the display unit 14 displays the analyzed difference cause (step S4).

Thus, the numerical control device 10 that has the plurality of types of speed compensation functions of compensating the command speed Vx of the motor and controls driving of the motor includes the command speed calculating unit 30, the speed/acceleration control unit 32, the motor control unit 34, the data storage unit 36, the difference pattern table 38, the cause analyzing unit 40 and the display unit 14. The command speed calculating unit 30 calculates the command speed Vx by analyzing the machining program 50 or according to the operator's operation. The speed/acceleration control unit 32 calculates the control speed Vc of the motor and the control acceleration Ac based on the command speed Vx and one or more of the speed compensation functions that are actually activated. The data storage unit 36 controls the motor according to the control speed Vc and the control acceleration Ac. The data storage unit 36 cyclically associates and stores the command speeds Vx and the actual speeds Vy of the motor in chronological order. The difference pattern table 38 associates and stores the causes that the command speed Vx and the actual speed Vy differ, and the difference patterns of the causes. The cause analyzing unit 40 analyzes the cause of the difference between the command speed Vx and the actual speed Vy by comparing the command speeds Vx and the actual speeds Vy stored in chronological order in the data storage unit 36, and the difference patterns stored in the difference pattern table 38. The display unit 14 displays the cause analyzed by the cause analyzing unit 40.

Consequently, even when the plurality of types of speed compensation functions compensate the command speed Vx, the operator can easily recognize the cause of the difference between the command speed Vx and the actual speed Vy, i.e., which speed compensation function has changed the actual speed Vy from the command speed Vx. Further, even when an actual speed differs from a command speed under a situation that the operator does not intend, due to inadequacy of signal setting and inadequacy of parameter setting, the operator can easily recognize the cause of the difference.

The display unit 14 displays as the graph the command speeds Vx and the actual speeds Vy stored in chronological order in the data storage unit 36, so that the operator can easily recognize how the actual speed Vy changes from the command speed Vx.

The plurality of types of speed compensation functions are classified into the first speed compensation functions that are switched to activate and deactivate by an operator's operation, and the second speed compensation function that is set to activate in advance. The speed compensation functions classified into the first speed compensation functions can be operated to activate and deactivate by the operator. However, when the operator forgets what operation the operator has performed, when another operator performs an operation or under the situation that the operator does not intend, due to the inadequacy of the signal setting or the inadequacy of the parameter setting, the speed compensation functions make it possible to easily recognize the cause of the difference between the command speed Vx and the actual speed Vy. Further, the speed compensation function classified into the second speed compensation function is set in advance to be activated. However, even in this case, the operator can easily recognize the cause of the difference between the command speed Vx and the actual speed Vy.

The speed/acceleration control unit 32 includes the compensated command speed calculating unit 62 that compensates the command speed Vx based on the command speed Vx and the activated speed compensation functions among the first speed compensation functions, and calculates the compensated command speed Vx', and the speed/acceleration calculating unit 64 that calculates the control speed Vc and the control acceleration Ac based on the compensated command speed Vx' and the second speed compensation function.

The speed/acceleration control unit 32 calculates the final control speed Vc by sequentially calculating from the command speed Vx the plurality of intermediate compensated speeds Vm associated with the plurality of types of speed compensation functions. The data storage unit 36 cyclically associates and stores the plurality of intermediate compensated speeds Vm in chronological order, as well as the command speeds Vx and the actual speeds Vy. The difference pattern table 38 stores the difference patterns of the command speeds Vx, the actual speeds Vy and the plurality of intermediate compensated speeds Vm in association with the causes of the difference between the command speed Vx and the actual speed Vy. The cause analyzing unit 40 analyzes the cause of the difference between the command speed Vx and the actual speed Vy by comparing the command speeds Vx, the actual speeds Vy and the plurality of intermediate compensated speeds Vm stored in chronological order in the data storage unit 36, and the difference patterns stored in the difference pattern table 38. Consequently, even when the causes of the difference between the command speed Vx and the actual speed Vy cannot be narrowed to one by using the command speed Vx and the actual speed Vy, it is possible to narrow the causes to one by using the intermediate compensated speeds Vm. Consequently, when the plurality of types of speed compensation functions compensate the command speed or when the actual speed differs from the command speed under the situation that the operator does not intend, due to the inadequacy of the signal setting or the inadequacy of the parameter setting, the operator can easily recognize the cause of the difference between the command speed Vx and the actual speed Vy.

The cause analyzing unit 40 calculates the changes of the speeds changed by the speed compensation function from the command speeds Vx to the actual speeds Vy stored in chronological order in the data storage unit 36, and the display unit 14 displays the command speeds Vx and the actual speed Vy stored in chronological order in the data storage unit 36 as the graph, and displays the changes of speeds per speed compensation function as the stacked bar graph. Consequently, the operator can recognize which speed compensation function changes the speed to what extent, among the changes of the speeds from the command speeds Vx to the actual speeds Vy stored in chronological order in the data storage unit 36.

The speed compensation functions include at least one of the function of increasing the actual speed Vy compared to the command speed Vx, the function of decreasing the actual speed Vy compared to the command speed Vx and the function of setting the actual speed Vy to zero. Consequently, the speed compensation functions can flexibly compensate the actual speed Vy with respect to the command speed Vx.

Although a preferred embodiment of the present invention has been described in detail above, the present invention is not limited to the present embodiment, and it goes without saying that various modifications may be made to the embodiment without departing from the scope of the present invention as set forth in the appended claims.

What is claimed is:

1. A numerical control device for controlling driving of a motor, the numerical control device comprising:
   a processor programmed to
      calculate a command speed of the motor by analyzing a machining program or according to an operation of an operator,
      compute a control speed and a control acceleration of the motor, based on the command speed and a plurality of speed compensation functions for compensating the command speed of the motor, the plurality of the speed compensation functions being actually activated, wherein
      the plurality of speed compensation functions includes (i) a first speed compensation function to be activated and deactivated by the operation of the operator, and (ii) a second speed compensation function set in advance to activate, and
      the processor is programmed to sequentially execute the first speed compensation function and the second speed compensation function to compute the control speed and the control acceleration from the command speed;
   a motor control unit configured to control the motor according to the control speed and the control acceleration;
   a data storage unit configured to cyclically associate and store the command speed and an actual speed of the motor in a chronological order;
   a difference pattern table configured to associate and store
      the plurality of the speed compensation functions that causes a difference between the command speed and the actual speed, and
      a plurality of difference patterns each being a pattern of the difference between the command speed and the actual speed caused by a corresponding speed compensation function of the plurality of speed compensation functions,
   wherein the processor is further programmed to perform an analysis to identify the speed compensation functions that cause the difference between the command speed and the actual speed, by comparing the command speed and the actual speed stored in the chronological order in the data storage unit, with the plurality of difference patterns stored in the difference pattern table; and
   a display unit configured to display a result of the analysis performed by the processor to show to the operator which speed compensation function among the plurality of speed compensation functions has caused the difference between the command speed and the actual speed.

2. The numerical control device according to claim 1, wherein
   the display unit is configured to display, as a graph, the command speed and the actual speed stored in the chronological order in the data storage unit, and
   the display unit is further configured to indicate, in the graph, the speed compensation function that has caused the difference between the command speed and the actual speed.

3. The numerical control device according to claim 1, wherein
   the processor is programmed to
      execute the first speed compensation function to compensate the command speed and calculate a compensated command speed, and
      execute the second speed compensation function to calculate the control speed and the control acceleration from the compensated command speed.

4. The numerical control device according to claim 1, wherein:
   the processor is programmed to calculate the control speed that is final by sequentially calculating from the command speed a plurality of intermediate compensated speeds associated with the plurality of speed compensation functions,
   the data storage unit is configured to cyclically associate and store the plurality of intermediate compensated speeds in the chronological order, as well as the command speed and the actual speed,
   the difference pattern table is configured to store, as a difference pattern associated with the speed compensation function that causes the difference between the command speed and the actual speed,
      the command speed,
      the actual speed, and
      the plurality of intermediate compensated speeds between the command speed and the actual speed, and
   the processor is programmed to perform the analysis to identify the speed compensation function that causes the difference between the command speed and the actual speed by comparing the command speed, the actual speed, and the plurality of intermediate compensated speeds stored in the chronological order in the data storage unit, with the plurality of difference patterns stored in the difference pattern table.

5. The numerical control device according to claim 1, wherein:
the processor is programmed to calculate the control speed that is final by sequentially calculating from the command speed a plurality of intermediate compensated speeds associated with the plurality of speed compensation functions,
the data storage unit is configured to cyclically associate and store the plurality of intermediate compensated speeds in the chronological order, as well as the command speed and the actual speed,
the processor is programmed to calculate a change of a speed, the speed being changed by the speed compensation functions from the command speed and the plurality of intermediate compensated speeds to the actual speed stored in the chronological order in the data storage unit, and
the display unit is configured to display, as a graph, the command speed and the actual speed stored in the chronological order in the data storage unit, and display the change of the speed per speed compensation function as a stacked graph.

6. The numerical control device according to claim 1, wherein the plurality of speed compensation functions include at least one of interlock, machine lock, override, an external speed, and acceleration/deceleration after interpolation.

7. The numerical control device according to claim 1, wherein:
the processor is programmed to execute the plurality of speed compensation functions according to a predetermined order; and
the speed compensation function that is deactivated does not compensate a speed.

8. The numerical control device according to claim 1, wherein the speed compensation functions each include at least one of a function of increasing the actual speed compared to the command speed, a function of decreasing the actual speed compared to the command speed, and a function of setting the actual speed to zero.

9. A cause analyzing method for a numerical control device to control driving of a motor, the method comprising:
a command speed calculating step of calculating a command speed of the motor by analyzing a machining program or according to an operation of an operator;
a speed/acceleration controlling step of computing a control speed and a control acceleration of the motor, based on the command speed and a plurality of speed compensation functions for compensating the command speed of the motor, the plurality of the speed compensation functions being actually activated, wherein
the plurality of speed compensation functions includes (i) a first speed compensation function to be activated and deactivated by the operation of the operator, and (ii) a second speed compensation function set in advance to activate, and
the computing comprises sequentially executing the first speed compensation function and the second speed compensation function to compute the control speed and the control acceleration from the command speed;
a motor controlling step of controlling the motor according to the control speed and the control acceleration;
a storing step of
cyclically associating and storing the command speed and an actual speed of the motor in chronological order in a data storage unit, and
associating and storing, in a difference pattern table, the plurality of the speed compensation functions that causes a difference between the command speed and the actual speed, and a plurality of difference patterns each being a pattern of the difference between the command speed and the actual speed caused by a corresponding speed compensation function of the plurality of speed compensation functions;
a cause analyzing step of performing an analysis to identify the speed compensation functions that cause the difference between the command speed and the actual speed, by comparing the command speed and the actual speed stored in the chronological order in the data storage unit, with the plurality of difference patterns stored in the difference pattern table; and
a displaying step of displaying a result of the analysis performed in the cause analyzing step on a display unit to show to the operator which speed compensation function among the plurality of speed compensation functions has caused the difference between the command speed and the actual speed.

10. The cause analyzing method according to claim 9, wherein the speed/acceleration controlling step includes:
a compensated command speed calculating step of executing the first speed compensation function for compensating the command speed and calculating a compensated command speed; and
a speed/acceleration calculating step of executing the second speed compensation function for calculating the control speed and the control acceleration from the compensated command speed.

11. The cause analyzing method according to claim 9, wherein:
in the speed/acceleration controlling step, the control speed that is final is calculated by sequentially calculating from the command speed a plurality of intermediate compensated speeds associated with the plurality of speed compensation functions,
in the storing step, the plurality of intermediate compensated speeds, as well as the command speed and the actual speed, are cyclically associated and stored in the chronological order in the data storage unit,
the difference pattern table stores, as a difference pattern associated with the speed compensation function that causes the difference between the command speed and the actual speed,
the command speed,
the actual speed, and
the plurality of intermediate compensated speeds between the command speed and the actual speed, and
in the cause analyzing step, the speed compensation function that causes the difference between the command speed and the actual speed is identified by comparing the command speed, the actual speed and the plurality of intermediate compensated speeds stored in the chronological order in the data storage unit, with the plurality of difference patterns stored in the difference pattern table.

12. The cause analyzing method according to claim 9, wherein:

in the speed/acceleration controlling step, the control speed that is final is calculated by sequentially calculating from the command speed the plurality of intermediate compensated speeds associated with the plurality of speed compensation functions, in the storing step, the plurality of intermediate compensated speeds, as well as the command speed and the actual speed, are cyclically associated and stored in the chronological order in the data storage unit, in the cause analyzing step, a change of a speed is calculated, the speed being changed by the speed compensation function from the command speed and the plurality of intermediate compensated speeds to the actual speed stored in the chronological order in the data storage unit, and in the displaying step, the command speed and the actual speed stored in the chronological order in the data storage unit are displayed as a graph, and the change of the speed per speed compensation function is displayed as a stacked graph.

13. The cause analyzing method according to claim 9, wherein:

in the speed/acceleration controlling step, the plurality of speed compensation functions are executed according to a predetermined order; and the speed compensation function that is deactivated does not compensate a speed.

\* \* \* \* \*